July 9, 1935.  W. H. KNISKERN  2,007,251
PROCESS AND APPARATUS FOR DISPENSING MEASURED QUANTITIES OF LIQUEFIED GAS
Filed April 14, 1934  2 Sheets-Sheet 1
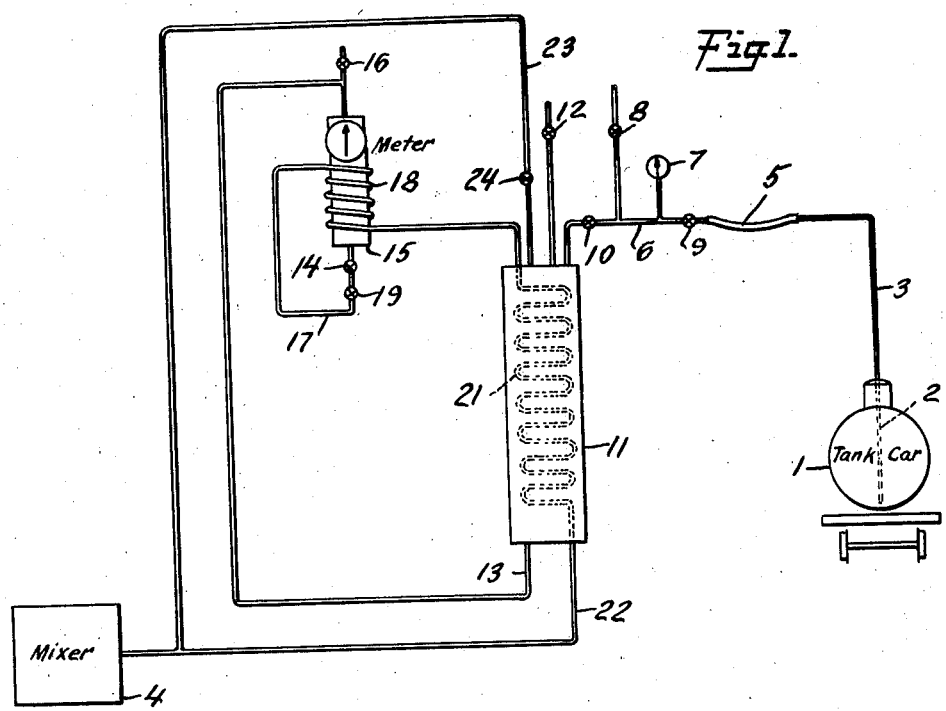
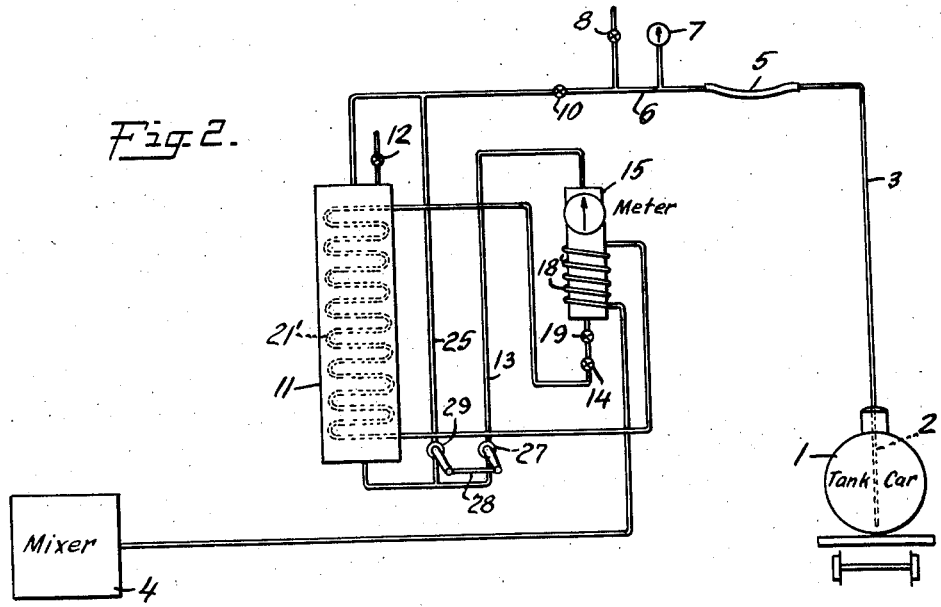
INVENTOR
Walter H. Kniskern
BY
ATTORNEY July 9, 1935. W. H. KNISKERN 2,007,251
PROCESS AND APPARATUS FOR DISPENSING MEASURED QUANTITIES OF LIQUEFIED GAS
Filed April 14, 1934 2 Sheets-Sheet 2

INVENTOR
Walter H. Kniskern
BY
ATTORNEY

Patented July 9, 1935

2,007,251

UNITED STATES PATENT OFFICE 2,007,251

PROCESS AND APPARATUS FOR DISPENSING MEASURED QUANTITIES OF LIQUEFIED GAS

Walter H. Kniskern, Petersburg, Va., assignor to Atmospheric Nitrogen Corporation, New York, N. Y., a corporation of New York Application April 14, 1934, Serial No. 720,536

19 Claims. (Cl. 62—1)

This invention relates to the dispensing of measured amounts of liquefied gas maintained under superatmospheric pressure, and more particularly, to the dispensing of measured amounts of liquid anhydrous ammonia from a tank car in which the ammonia is maintained under superatmospheric pressure into a mixer, such as a fertilizer mixer.

The usual practice in dispensing liquid ammonia from a tank car has included a measuring tank, and an ammonia compressor which has been employed to withdraw gas from the top of the measuring tank and discharge it into the top of the tank car, thus creating a pressure differential between the tank car or other storage tank and the measuring tank sufficient to cause the liquid ammonia to flow from the tank car into the measuring tank. In certain instances a compressor has been employed to force air or inert gas into the tank car, thus creating a pressure in the tank car higher than the pressure corresponding to the temperature in the measuring tank. These procedures are objectionable because of the relatively expensive equipment required for their practice and the expense involved in the maintenance and operation of such equipment.

The discharge of liquid ammonia from the tank car into the measuring tank by venting the measuring tank to the atmosphere, which would reduce the pressure in the measuring tank beneath the pressure in the tank car, is not commercially desirable because of the loss of ammonia incident to such operation. The provision of equipment for recovering the ammonia thus vented involves the objectionable expense of constructing, maintaining, and operating the recovery equipment.

Furthermore, the ammonia cannot be vented to the mixer without interfering with operation, since the operation of a fertilizer mixer is usually, if not always, a batch operation, and it is necessary to synchronize the introduction of ammonia with a certain step of the mixing procedure. For example, in the ammoniation of superphosphate or superphosphate mixtures, it is the practice to spray the ammonia over the superphosphate material immediately after it has entered the mixer. Accordingly, if it is attempted to vent the measuring tank to the mixer, the measuring tank can be filled only after the introduction of superphosphate into the mixer, at which time the mixer is ready to receive the full charge of ammonia. This causes a delay in operation.

It is an object of this invention to provide a simple and efficient procedure and apparatus for dispensing measured quantities of a liquefied gas, such as ammonia, from a tank car or other main bulk thereof under superatmospheric pressure into a mixer, such as a fertilizer mixer, the dispensing of the ammonia in normal operation being independent of the mixer and being accomplished without the use of pumps or compressors. Other objects and advantages of this invention will be apparent from the following detailed description.

In accordance with this invention, ammonia is fed from a main bulk thereof through a meter into a fertilizer mixer. The passage of gaseous ammonia through the meter or the formation of gaseous ammonia in the meter during operation would result in erroneous readings; to prevent this meter and the liquid ammonia passing through it are cooled to a temperature below that of the main bulk of liquid ammonia and to a temperature such that its vapor pressure is less than the actual pressure existing in the meter. Preferably, cooling of the meter may be accomplished by expanding some or all of the ammonia leaving the meter in heat exchange relation with the liquid ammonia entering the meter. Ammonia is impelled through the apparatus by the pressure in the tank car or other main bulk and since it has been precooled before reaching the meter to a temperature such that its vapor pressure is less than the actual pressure existing in the meter, gaseous ammonia does not form with consequent errors in readings.

In the preferred embodiments illustrated on the drawings, the invention is shown incorporated in liquid ammonia dispensing equipment and the present description will be confined to the illustrated embodiments of the invention. It will be understood, however, that the novel features and improvements are susceptible to other applications; such as the dispensing of measured amounts of other liquids having a high vapor pressure, for example to the dispensing of measured amounts of concentrated aqua ammonia, ammonium salt solutions, and the reference in the claims to "liquid ammonia" is intended to include such ammonia solutions. Hence, the scope of this invention is not confined to the embodiments herein described.

In the drawings—

Fig. 1 is a side elevation of apparatus embodying a preferred form of this invention;

Fig. 2 is a side elevation of apparatus equipped with control means for maintaining the temperature of the liquid ammonia passing through the meter substantially constant;

Figure 3:
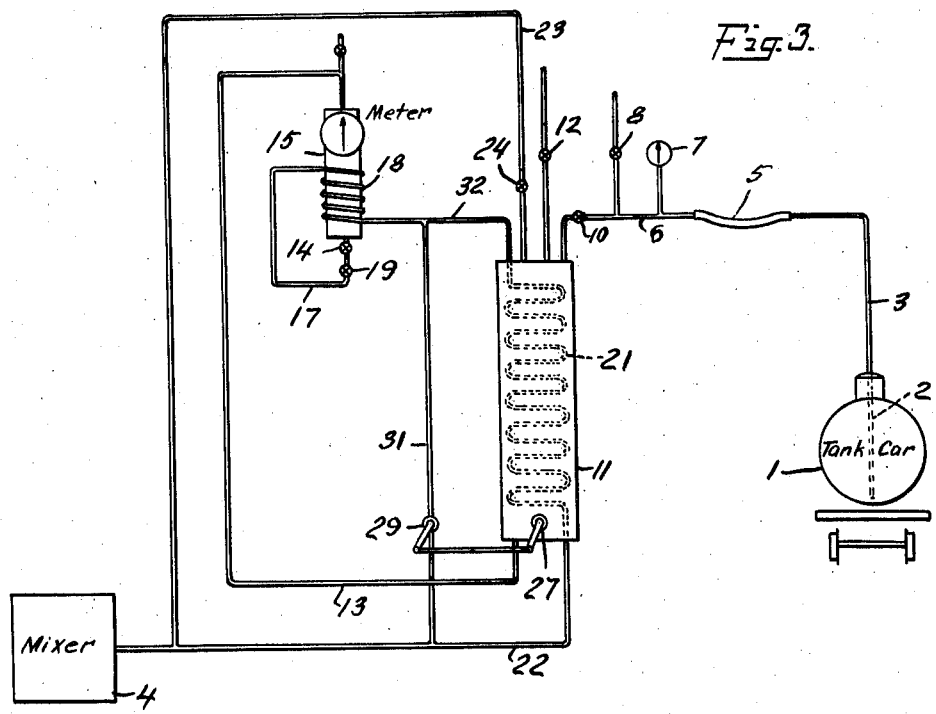
Fig. 3 is a side elevation of a modification of the apparatus of Fig. 2.

In the drawings, in which like parts in all the figures have been given like reference numerals, reference character 1 (Fig. 1) designates a tank car of usual construction for transporting anhydrous ammonia. This tank car is equipped with a dip pipe 2. A pipe 3 leads from dip pipe 2 to the apparatus hereinafter described for dispensing measured amounts of ammonia into a mixer 4. One end of pipe 3 may be connected by flexible connection 5 with a pipe 6 which may be provided with a pressure gauge 7, relief valve 8, and valves 9 and 10. Pipe 6 enters into the top of a cooler or tank 11 which is equipped with a relief valve 12. The bottom of this cooler is communicably connected by means of a pipe 13 with a meter 15. The meter may be of any well known type employed for metering liquids and has, accordingly, been diagrammatically illustrated in the drawings. This meter is equipped with a relief valve 16.

A pipe 17 leads from the meter outlet and communicates with a coil 18 disposed about the meter. The meter and coil may be suitably insulated so as to prevent loss of heat to the atmosphere and permit heat exchange between ammonia flowing through the coil and that passing through the meter. At the inlet of pipe 17, valve 14 and expansion valve 19 are positioned. Coil 18 communicates with a second coil 21 disposed in tank 11. Line 22 leads from coil 21 to the fertilizer mixer 4.

The cooler or tank 11 may be equipped with a by-pass line 23 having valve 24 therein for venting the tank 11 to the mixer when starting up the apparatus.

In starting up the apparatus of Fig. 1, valves 9 and 10 are opened, allowing liquid ammonia to flow under its vapor pressure from tank car 1 into cooler 11. If the cooler does not fill due to the vapor pressure within the tank car 1, valve 24 is opened, venting the gaseous ammonia in cooler 11 through pipe 23 into the mixer 4 which should contain material capable of absorbing ammonia. The cooler 11 will thus be partially or completely filled with liquid ammonia as desired and valve 10 is than closed. If valve 24 has not been opened to permit the filling of cooler 11, it is opened upon the completion of the filling of the cooler 11, permitting the ammonia in the cooler 11 to boil, thus chilling the portion of the ammonia remaining in the cooler 11, the ammonia gas passing into the mixer 4 through pipe 23. When the contents of cooler 11 are sufficiently chilled, say 10 to 40° F. below the temperature of the liquid ammonia in the tank car, valve 24 is closed, valves 10 and 14 are fully opened, and expansion valve 19 is partially opened, whereupon the cold ammonia within the cooler 11 will pass through line 13, meter 15, expanding after it leaves expansion valve 19, the expanded ammonia passing through the coil 18, thence through the coil 21, and finally passing into the mixer 4.

In normal operation, i. e., once the supply of ammonia in the cooler has been cooled to a temperature say 10 to 40° F. below the temperature in the tank car, it is not necessary to vent through valve 24. It is only necessary to open valve 14 until the desired quantity of precooled liquid ammonia as indicated by the meter has passed through the meter, after which valve 14 is closed.

The ammonia leaving the meter 15, expanded upon passage through valve 19 in heat exchange relation with that passing through the meter, cools the ammonia passing through the meter, thereby preventing the formation of gaseous ammonia in the meter. The expanded ammonia passes from coil 18 through coil 21, precooling the ammonia in the cooler 11. From the coil 21, the ammonia passes through line 22 into the mixer 4. It will be noted that the refrigerating effect obtained by expanding a portion of each metered charge of ammonia on its way to mixer 4 from the meter 15 is used to precool the charge which is to be passed through the meter 15, thus lowering the vapor pressure of the ammonia fed to the meter.

If desired, the liquid ammonia after leaving the meter may be caused to pass first through the coil in cooler 11 and then through the coil around the meter. Such arrangement of coils is shown in Fig. 2 in which reference character 21' indicates the coil in cooler 11 communicating with the outlet from the meter and reference character 18' indicates the coil communicating with coil 21' and disposed about the meter.

In the construction of Fig. 2, a by-pass line 25 connects the line 6 with the line 13 leading from the cooler 11 to the meter 15. A temperature-responsive device 27 of any well-known type is disposed in the line 13 and is connected by links 28 with a valve 29 in the by-pass line 25. Variations in temperature of the liquid ammonia flowing through line 13 to the meter 15 cause the temperature-responsive device 27 to actuate the valve 29 so as to open or close this valve and by-pass more or less ammonia from line 6 about the cooler 11. Thus, the temperature of the ammonia passing into the meter is maintained substantially constant. Hence, the density of the ammonia passing through meter 15 is maintained substantially constant. As the density of the liquid depends upon its temperature, by maintaining the temperature constant at a known point, the volume readings of the meter can readily be transposed into weight readings.

The modification of the invention shown in Fig. 3 is equipped with a temperature-responsive device 27 disposed at the base of cooler 11 and arranged to actuate a valve 29 in the by-pass line 31 leading from line 32 connecting coils 18 and 21 to line 22 and by-passing a portion of the ammonia from coil 18 around the coil in cooler 11 into the line 22 leading into the mixer. Depending upon changes in temperature in the liquid ammonia in cooler 11, valve 29 in by-pass line 31 is operated to cause more or less liquid ammonia to be by-passed about the coil in cooler 11 and hence maintain the temperature of the ammonia passed from the base of cooler 11 through the meter 15 at a substantially constant point.

Figure 4:
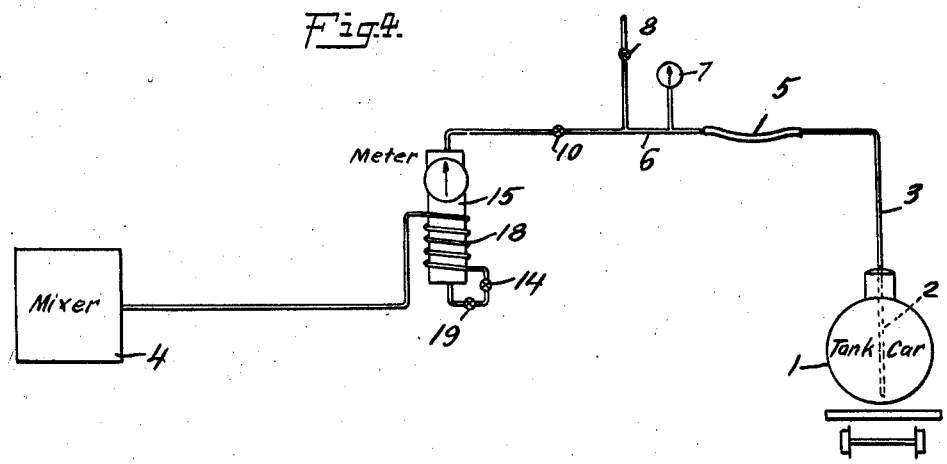
Fig. 4 is a side elevation of a modified form of apparatus embodying this invention.

In the embodiment of the invention shown in Fig. 4, cooler 11 is eliminated and the line 6 leads directly to the meter 15. The ammonia leaving the meter 15 passes through coil 18 in heat exchange relation with that entering and passing through the meter and thence into the mixer 4.

While the operation of the apparatus has generally been described as an intermittent procedure, it is obvious that if desired the apparatus may be used to meter a continuously flowing supply of liquid ammonia.

Since certain changes in carrying out the above process and in the construction set forth which embody the invention may be made without departing from its scope, it is intended that all matter contained in the above description or shown on the accompanying drawings shall be interpreted as illustrative and not in a limiting sense.

I claim:

1. The process of dispensing measured quantities of a liquefied gas from a main bulk thereof, which comprises passing the liquefied gas through a meter while cooling the meter to maintain the temperature therein below the temperature of the main bulk of said liquefied gas, thereby preventing the formation of gas bubbles in the meter.

2. The process of dispensing liquid ammonia from a main bulk thereof under superatmospheric pressure, which comprises intermittently passing the liquid ammonia through a meter until the desired charge has been passed therethrough while cooling the meter to maintain the temperature therein below the temperature of the main bulk of liquid ammonia, thereby preventing the formation of gaseous ammonia in the meter.

3. The process of dispensing measured quantities of liquid ammonia from a main bulk thereof, which comprises, passing the liquid ammonia from the main bulk through a meter and expanding the ammonia leaving the meter in heat exchange relation with the ammonia entering the meter, thereby preventing the formation of gas bubbles in the meter.

4. The process of dispensing measured quantities of a liquefied gas from a main bulk thereof, which comprises passing said liquefied gas through a meter while cooling said meter by expanding the liquefied gas leaving said meter in heat exchange relation with the liquefied gas introduced into said meter.

5. The process of dispensing measured quantities of liquid ammonia from a main bulk thereof under superatmospheric pressure, which comprises passing said ammonia through a meter while cooling said meter by expanding the liquid ammonia leaving said meter in heat exchange with the liquid entering said meter.

6. The process of dispensing measured quantities of liquefied gas from a main bulk thereof involving the passage of the liquefied gas through a meter, the improvement which comprises cooling the liquefied gas to a temperature below that of the main bulk thereof before passing it through the meter.

7. The process of dispensing measured quantities of liquid ammonia from a main bulk thereof under superatmospheric pressure involving the intermittent passage of the liquid ammonia through a meter until the desired charge has been metered, the improvement which comprises cooling the liquid ammonia to a temperature below that of the main bulk before passing it through the meter, thereby preventing the formation of gaseous ammonia in the meter.

8. The process of dispensing measured quantities of a liquefied gas from a main bulk thereof, which comprises passing said liquefied gas through a meter while cooling said meter by expanding the liquefied gas leaving said meter in heat exchange relation with the liquefied gas entering said meter, and maintaining the temperature of the liquefied gas passing through the meter substantially constant.

9. The process of dispensing liquid ammonia from a main bulk thereof under superatmospheric pressure, which comprises intermittently passing liquid ammonia through a meter until a desired charge of liquid ammonia has been metered, cooling said meter by expanding the ammonia leaving said meter in heat exchange with the ammonia entering the meter, and maintaining the temperature of the ammonia passing through the meter substantially constant.

10. The process of dispensing measured quantities of liquid ammonia from a tank car to a fertilizer mixer, which comprises passing the ammonia from the tank car through a meter until a desired charge has been passed therethrough, expanding the ammonia leaving the meter in heat exchange relation with the ammonia entering the meter, maintaining the temperature of the ammonia passing through the meter substantially constant, and passing the expanded ammonia into the fertilizer mixer.

11. The process of dispensing measured quantities of a liquefied gas from a main bulk thereof, which comprises passing the liquefied gas through a meter while cooling the meter structure to a temperature below the temperature corresponding to the vapor pressure of the liquefied gas in the meter.

12. The process of dispensing liquid ammonia from a main bulk thereof under superatmospheric pressure, which comprises passing the liquid ammonia through a meter until the desired charge has been passed therethrough while cooling the ammonia entering the meter to maintain the temperature thereof sufficiently low to make the vapor pressure of the ammonia entering the meter less than the actual pressure existing in the meter.

13. The process of dispensing liquid ammonia from a main bulk thereof under superatmospheric pressure, which comprises passing the liquid ammonia through a meter while cooling the ammonia to maintain the temperature thereof below the temperature corresponding to the actual pressure existing in the meter.

14. Apparatus for dispensing measured quantities of a liquefied gas from a main bulk thereof under superatmospheric pressure, in combination, a meter, means for feeding liquefied gas from said main bulk into said meter, and means for expanding liquefied gas leaving said meter in heat exchange relation with the liquefied gas passing through said meter.

15. Apparatus for dispensing measured quantities of a liquefied gas from a main bulk thereof under superatmospheric pressure, which comprises, in combination, a tank communicating with said main bulk, a meter having its inlet communicating with said tank, a coil having its inlet communicating with the outlet of said meter, said coil being disposed in heat exchange relation with said meter, an expansion valve in the inlet of said coil, and a second coil disposed in said tank and having its inlet communicating with the outlet of said first-mentioned coil.

16. Apparatus for dispensing measured quantities of liquefied gas from a main bulk thereof under superatmospheric pressure, which comprises a tank communicating with said main bulk, a meter having its inlet communicating with said tank, a coil having its inlet communicating with the outlet of said meter, said coil being disposed in heat exchange relation with said meter, an expansion valve at the inlet of said coil, a second coil disposed in said tank and having its inlet communicably connected with the outlet of said first-mentioned coil, and means responsive to changes in temperature of the liquefied gas passing through said tank for maintaining the liquefied gas passing through said meter at a substantially constant temperature.

17. Apparatus for dispensing measured quantities of liquid ammonia from a tank car into a fertilizer mixer comprising, in combination, a tank communicating with said tank car, a meter having its inlet communicating with said tank, a coil having its inlet communicating with the outlet of said meter, said coil being disposed in heat exchange relation with said meter, an expansion valve at the inlet of said coil, a second coil disposed in said tank and having its inlet communicably connected with the outlet of said first-mentioned coil, a temperature-responsive device in said tank, a by-pass about said second-mentioned coil, and a valve in said by-pass actuated by said temperature-responsive device to regulate the proportion of ammonia leaving the first-mentioned coil and passing through the second-mentioned coil.

18. Apparatus for dispensing measured quantities of liquid ammonia from a tank car into a fertilizer mixer comprising in combination, a tank communicating with said tank car, a meter having its inlet communicating with said tank, a coil having its inlet communicating with the outlet of said meter, said coil being disposed in heat exchange relation with said meter, an expansion valve at the inlet of said coil, a second coil disposed in said tank and having its inlet communicably connected with the outlet of said first-mentioned coil, a temperature-responsive device disposed in the inlet line of said meter, a by-pass line leading from the connection between the tank car and said tank to the inlet of said meter, and a valve in said by-pass line actuated by said temperature-responsive device to regulate the proportion of liquid ammonia passed from said tank car through said tank.

19. Apparatus for dispensing measured quantities of liquefied gas from a main bulk thereof under superatmospheric pressure, which comprises, in combination, a tank communicating with said main bulk, a meter having its inlet communicating with said tank, a coil communicating with the outlet of said meter and disposed in said tank, and an expansion valve through which liquefied gas from said meter passes before passing through said coil.

WALTER H. KNISKERN.